United States Patent
Herwig et al.

(10) Patent No.: US 7,404,859 B2
(45) Date of Patent: Jul. 29, 2008

(54) INSTALLATION FOR COATING OBJECTS

(75) Inventors: Gernot Herwig, Holzgerlingen (DE); Martin Doll, Schönbuch (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 247 days.

(21) Appl. No.: 10/521,506

(22) PCT Filed: Jun. 18, 2003

(86) PCT No.: PCT/EP03/06403

§ 371 (c)(1), (2), (4) Date: Mar. 28, 2005

(87) PCT Pub. No.: WO2004/001086

PCT Pub. Date: Jan. 22, 2004

(65) Prior Publication Data

US 2006/0162648 A1  Jul. 27, 2006

(30) Foreign Application Priority Data

Jul. 12, 2002  (DE) ............................... 102 31 504

(51) Int. Cl.
*B05C 15/00* (2006.01)

(52) U.S. Cl. ........................ 118/326; 118/66
(58) Field of Classification Search ................ 118/66, 118/324, 326; 198/793, 860.1, 860.2, 465.1, 198/795

See application file for complete search history.

(56) References Cited

U.S. PATENT DOCUMENTS

| 4,402,393 A | * | 9/1983 | Kent ....................... 198/345.3 |
| 4,831,962 A | | 5/1989 | Gros |
| 5,556,466 A | * | 9/1996 | Martin et al. ................. 118/67 |
| 5,720,817 A | | 2/1998 | Taylor |
| 6,464,066 B2 | * | 10/2002 | Bethke et al. ............ 198/465.1 |

FOREIGN PATENT DOCUMENTS

DE  94 22 327 U1  4/2000
EP  0 718 179 A1  6/1996

* cited by examiner

*Primary Examiner*—Laura Edwards
(74) *Attorney, Agent, or Firm*—Factor & Lake, Ltd.

(57) ABSTRACT

The invention relates to an installation for coating objects, said installation having, in a manner known per se, a coating chamber which is arranged upstream from a drying chamber. The objects to be coated are carried by skids which are guided through the coating chamber and the drying chamber by means of a skid transport system. Each skid comprises two skid runners, extending parallel to the direction of displacement, and is embodied in such a way that adjacent skids can travel inside each other such that they partially overlap in the direction of displacement. In this way, the objects carried by successive skids can be separated from each other in the coating chamber such that all of the surfaces of the objects to be coated can be easily reached by the application devices.

6 Claims, 4 Drawing Sheets

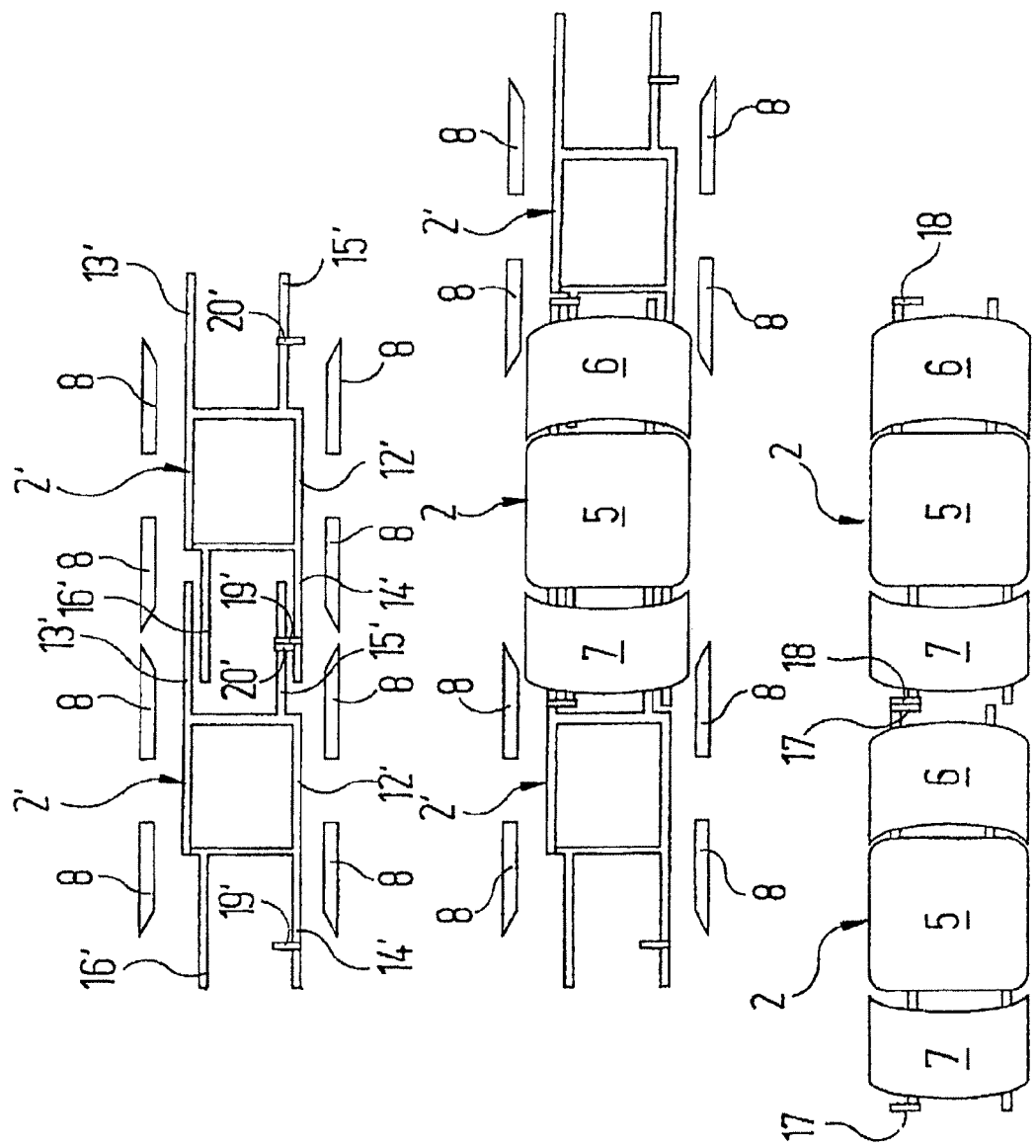

INSTALLATION FOR COATING OBJECTS

BACKGROUND OF THE INVENTION

The invention relates to an installation for coating objects, in particular vehicle bodies and parts thereof, comprising a) a coating booth, in which at least one application device is arranged;

b) a drying booth downstream of the coating booth;

c) a plurality of skids having two skid runners which run parallel to the movement direction and each carrying at least one object to be coated;

d) a skid-conveying system, on which the skid runners of the skids rest and which guides the skids through the coating booth and the drying booth.

When operating such an installation, it is necessary to position the objects to be coated on the skids in such a way that the application devices can reach all the surfaces to be coated. This is often successfully achieved only by the successive skids being at a relatively large distance from one another and/or the objects being movably arranged on the skids. Large distances are associated with a large installation length, however; the movement of objects to be coated requires suitable apparatus or manual labour. Both lead to correspondingly high costs.

SUMMARY OF THE INVENTION

The object of the present invention is to design an installation of the type mentioned at the outset in such a way that the installation length and the costs associated therewith are minimised.

This object is achieved according to the invention in that e) adjacent skids are movable into one another such that they partially overlap in the movement direction.

While conventional skids can only come so close to one another that their skid runners butt against one another, a skid according to the invention is designed in such a way that it can partially move into an adjacent skid lying in front of it or behind it in the movement direction. Only in the coating booth are the skids moved so far apart from one another, i.e. is such a large distance created between them, that all the surfaces of the objects carried by the skids can be reached by the application device without these objects needing to be moved to do so. As soon as the respective skid leaves the coating booth, however, its distance from the skid in front is increasingly reduced until finally its leading region "plunges" into the trailing region of the skid travelling in front of it in the movement direction. This produces a succession of skids, the total length of which is less than the sum of the runner lengths of the skids present in the entire assembly. The extent to which the adjacent skids move into one another is chosen such that the objects which are carried by the skids and are to be coated do not come into mutual contact. In this context, it is also possible to choose arrangements where the objects carried by the skids are arranged laterally beside one another (in relation to the movement direction) when adjacent skids are in the position where they have moved into one another.

Because of the small total length occupied by the assembly of skids when they are in the state where they have moved into one another, the installation components, in particular the drying booth, upstream and downstream of the coating booth can be kept very short. This has a direct effect on the costs of the installation.

Of course, the feature of the skids of being movable into one another in the above-mentioned sense requires a special construction: this may, for example, be realised in that the skids have a supporting structure comprising:

a) a supporting frame, of which the sides running parallel to the movement direction are formed by the two skid runners, the first skid runner projecting forwards beyond the supporting frame in the movement direction, while the second skid runner projects rearwards beyond the supporting frame counter to the movement direction;

b) a front support, which is connected to the supporting frame and projects forwards beyond the supporting frame parallel to the first skid runner, but is at a distance from the first skid runner which is less than the distance between the two skid runners;

c) a rear support, which is connected to the supporting frame and projects rearwards beyond the supporting frame parallel to the second skid runner, but is at a distance from the second skid runner which is less than the distance between the two skid runners.

In this embodiment of the installation according to the invention, each skid therefore has in the front and rear region a kind of carrying fork, one "prong" of which is formed by a skid runner and the other "prong" of which is formed by a support running parallel thereto. The carrying forks can move into one another because of the fact that the distance between their "prongs" is less than the distance between the skid runners. The skid runners of a skid in this design are offset from one another in the movement direction. Each side of a skid, considered on its own, is therefore supported over only part of the skid length by the skid runner; considered as a whole, however, the skid rests throughout its entire length at least on one skid runner.

Each skid should have stops which define the extent to which adjacent skids are movable into another. This extent depends on the objects which are carried by the skids and which, as stated above, must under no circumstances come into mutual contact.

The circumstances are often such that "mixed operation" of the installation takes place. This means that successive skids carry different objects to be coated. In this case, that embodiment of the invention is advantageous in which each skid has first stops, which define the extent to which adjacent skids carrying identical objects are movable into one another, and second stops, which define the extent to which adjacent skids carrying different objects are movable into one another. The greatest possible extent of the movement into one another between skids adjacent in the movement direction thus always occurs outside the coating booth, and this results in the shortest possible total length of the skid assembly.

The second type of stops can be formed by the skid runners and/or the supports.

BRIEF DESCRIPTION OF THE DRAWINGS

An exemplary embodiment of the invention is explained in more detail below with reference to the drawing, in which:

FIG. 3 shows two skids, both carrying the same, first kind of objects, when pushed into one another;

FIG. 4 shows two skids, carrying objects of the first and another, second kind, likewise when pushed into one another;

FIG. 5 shows two skids, both carrying the same, second kind of objects, when pushed into one another;

DETAILED DESCRIPTION OF THE PREFERRED EMBODIMENT

Figure 1:
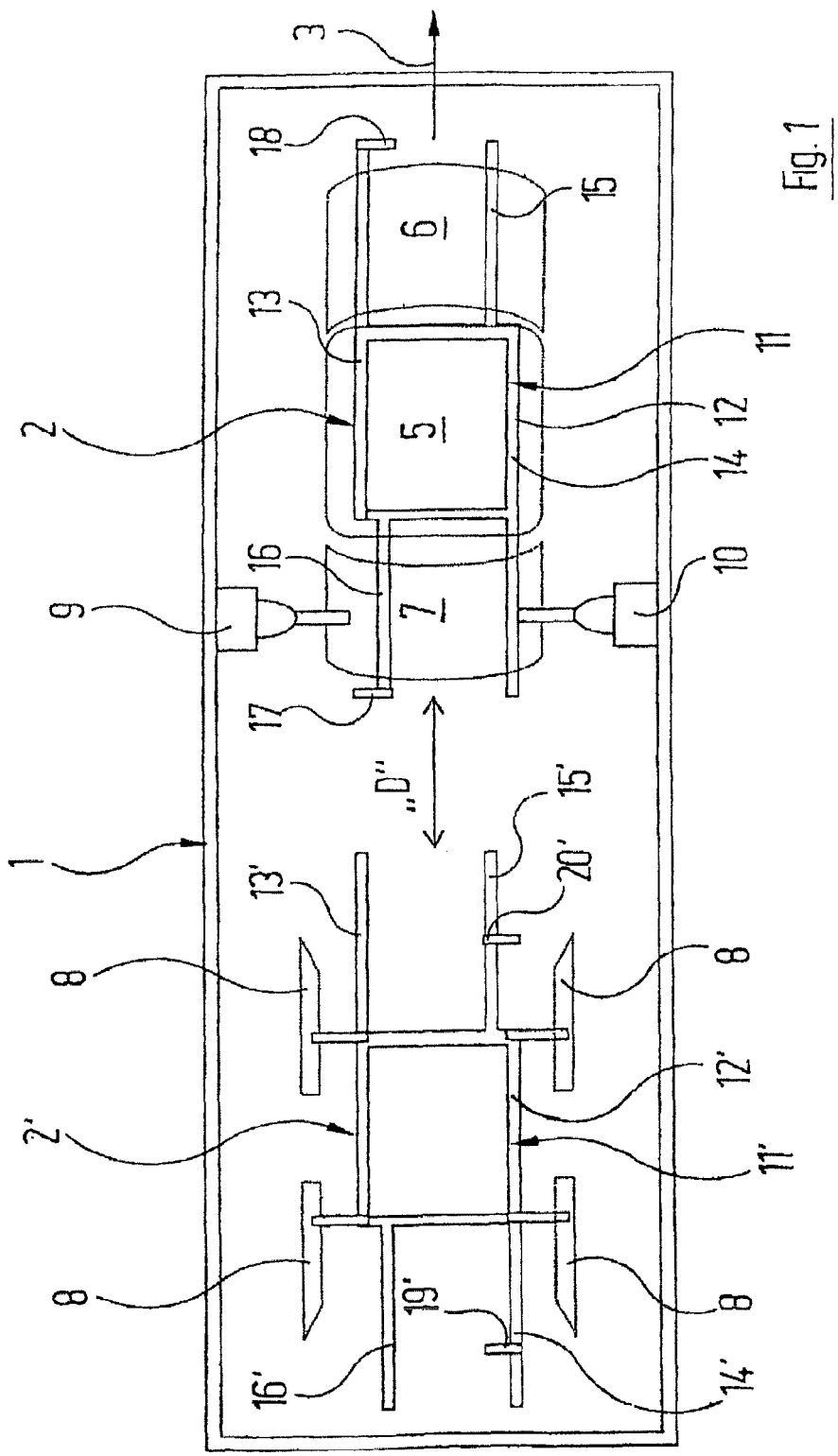
FIG. 1 shows, in a schematic plan view, two skids according to the invention, carrying different objects, inside a coating booth.

Reference is made first of all to FIG. 1. This figure illustrates, in a highly schematic plan view, a painting booth 1 with the booth roof removed. Inside the painting booth 1 two skids 2, 2' can be seen, the construction of which is explained in more detail below. The two skids 2, 2' are conveyed through the painting booth 1 in the direction of the arrow 3 at a distance D from one another with the aid of a skid-conveying system (not illustrated). For this purpose, the painting booth 1 is of course provided with suitable doors (not illustrated) at its narrow sides.

The skid 2 travelling in front in the direction of the arrow 3 carries parts of a vehicle body, namely the roof 5 or a part of the roof, the front gate 6 and the rear gate 7. The doors 8 of the vehicle body are taken off and conveyed separately from the parts 5, 6, 7 on the skid 2' following the skid 2 in the movement direction (arrow 3).

As they pass through the painting booth 1, the parts 5, 6, 7 and the separately conveyed doors 8 are coated by two application devices 9, 10 arranged on opposite sides of the painting booth 1.

Both skids 2, 2' have the same supporting structure 11, 11', on which different, specific holding devices (not illustrated in the drawing) are provided in accordance with the objects carried by the skids. The supporting structure 11 of the skid 2 is described below; what is stated applies analogously to the supporting structure 11' of the skid 2':

The supporting structure 11 has a central, rectangular frame 12, the side of which on the left in the movement direction (arrow 3) is formed by a skid runner 13. The skid runner 13 projects beyond the frame 12 in the movement direction by approximately the length of the frame 12. It rests at the bottom on the corresponding conveying elements of the skid-conveying system.

Correspondingly, the side of the frame 12 on the right in the movement direction is formed by a second skid runner 14, which projects rearwards from the frame 12 counter to the movement direction (arrow 3) again by approximately the length of the frame 12.

Parallel to the forward-projecting skid runner 13, a sectional support 15 is joined to the front transverse side of the frame 12, but the distance between the skid runner 13 and the sectional support 15 is less than the distance between the skid runners 13, 14. Correspondingly, a second sectional support 16, extending parallel to the skid runner 14 (and hence also parallel to the skid runner 13) is joined to the rear transverse side of the frame 12, but again is at a distance from the skid runner 14 which is less than the distance between the two skid runners 13, 14.

In the construction described, the two skid runners 13, 14 are offset from one another in the movement direction of the skid 2 by one third of the total length of the skid 2. The skid 2 is therefore supported on each side, taken individually, over only two thirds of its length; nevertheless, by offsetting the two skid runners 13, 14 from one another, the skid 2 is supported over its entire length on the underlying skid-conveying system.

Figure 2:
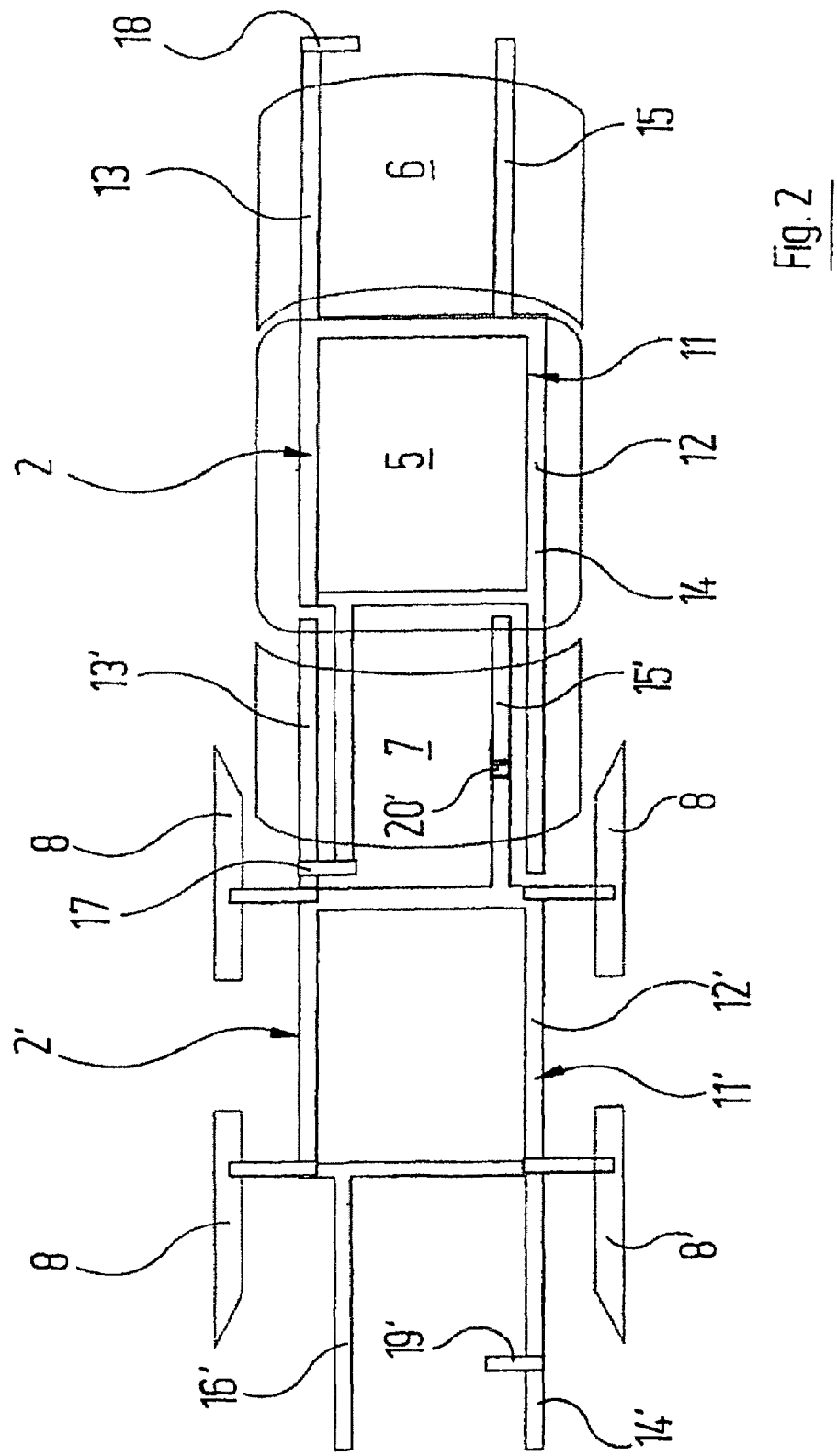
FIG. 2 shows the two skids of FIG. 1 when pushed into one another, outside the coating booth.

Inside the painting booth 1, the skids 2, 2', as illustrated there, are at a distance D from one another, so that the application devices 9, 10 can easily reach all the surfaces to be painted, without certain objects having to be moved with the aid of robots or manually. If the skids 2, 2' could only be moved together to a distance of "zero" as is customary with the known designs, this would greatly increase the cost of the installation because of its greater length. For this reason, the skids 2, 2' are movable into one another to a certain extent, outside the painting booth 1, as is illustrated in FIG. 2 and explained in detail below.

To fix the extent to which the skids 2, 2' can be moved into one another, the skids 2, 2' each have respective stops 17, 18 and 19', 20' on the respective components 13, 16 and 14', 15' projecting beyond the central frame 12, 12'.

The skid 2 carrying the parts 5, 6, 7 has an inward-projecting stop 18 at the outermost, leading end of the skid runner 13 and an outward-projecting stop 17 at the outermost, trailing end of the sectional support 16. The skid 2' carrying the doors 8 has an upward-projecting stop 20' between the ends of the sectional support 15' leading in the movement direction and an inward-projecting stop 19' at a distance from the trailing end of the skid runner 12'.

The way in which these stops 17, 18, 19', 20' limit the pushing into one another of successive skids 2, 2' becomes clear from FIGS. 3 to 5.

Reference is made first of all to FIG. 4, which relates to the case described so far with reference to FIGS. 1 and 2, where skids 2, 2' follow one another and of which the ones (2) each carry the parts 5, 6, 7, while the others (2') carry the associated doors 8. These skids 2, 2' can be pushed into one another, as illustrated in FIGS. 2 and 4, until the ends of the front and rear carrying forks of adjacent skids 2, 2' butt against a transverse side of the frame 12, 12' of the adjacent skid 2, 2'. This is the furthest extent to which the skids 2, 2' can be moved into one another. To prevent the objects 5, 6, 7, 8 carried by the skids 2, 2' from coming into contact with one another, the doors 8 on the skids 2' are moved laterally outwards to such an extent that they can each laterally overlap the rear gate 7 and the front gate 6, respectively, on adjacent skids 2.

FIG. 3 illustrates a situation in which solely skids 2' carrying doors 8 follow one another. Here, the stops 19' and 20' of successive skids 2' come into action. As FIG. 3 shows, the successive skids 2' thus cannot come as close as the skids 2, 2' in FIG. 4. This prevents the doors 8 arranged on the skids 2' from coming into contact with one another.

FIG. 5, finally, shows the situation in which solely skids 2 carrying the parts 5, 6, 7 are present. In this case, the respective end stops 17, 18 of the skids 2 come into action and prevent the carrying forks 13, 14, 15, 16 projecting beyond the respective frames 12 of the skids 2 from being able to plunge into one another, so that the successive parts 5, 6, 7 again do not butt against one another, but nevertheless the smallest possible distance between successive skids 2 is achieved.

Figure 6:
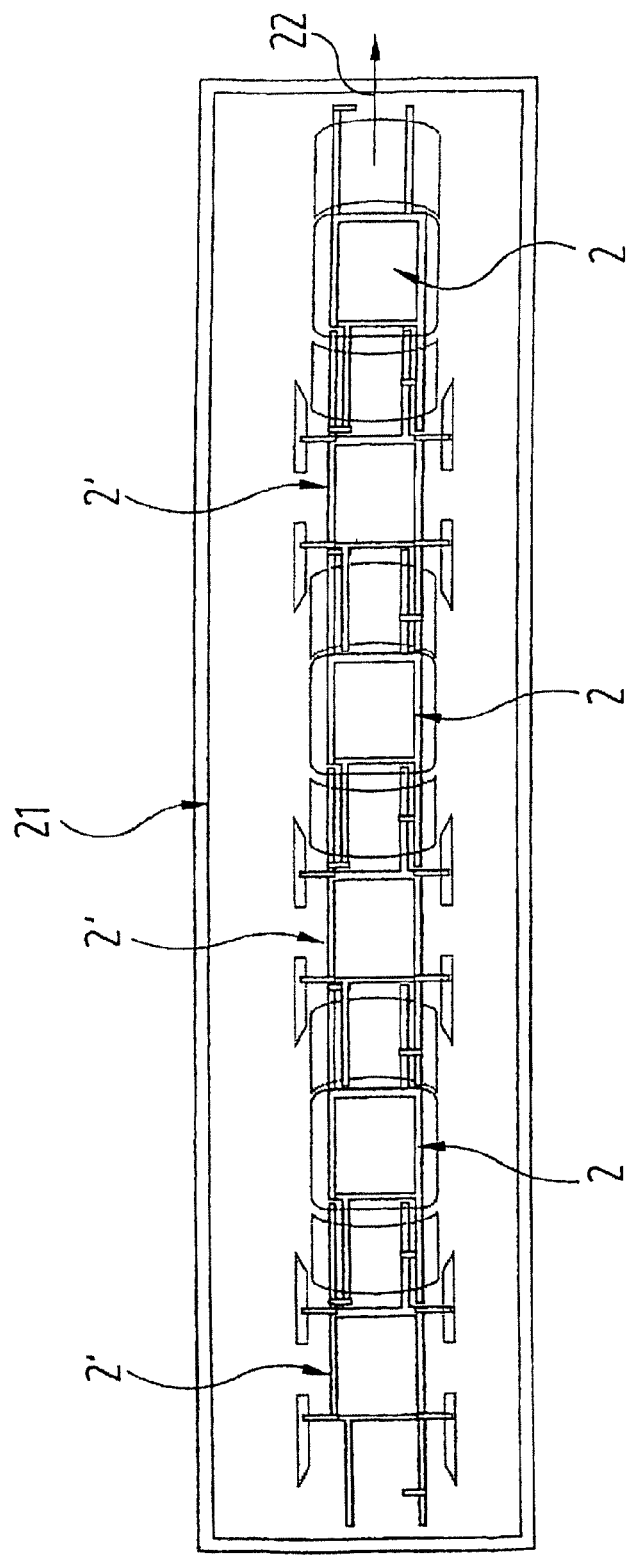
FIG. 6 shows, in a schematic plan view, a drier in which a plurality of skids carrying different objects are illustrated when pushed into one another.

FIG. 6 shows schematically, in a way similar to FIG. 1, the situation in a drying booth bearing the reference symbol 21. The roof of the drying booth 21 has again been removed; this makes it possible to see that three skids 2' carrying doors 8 and three skids 2 each carrying a part 5, 6, 7 are situated inside the drying booth 21. These skids 2, 2' are again moved through the drying booth 21 in the direction of the arrow 22 with the aid of a skid-conveying system (not illustrated), the drying booth for this purpose being provided with doors (not illustrated) at its narrow sides. The skids 2, 2' are pushed as far as possible into one another inside the drying booth 21, in accordance with the illustration in FIGS. 2 and 4, so that the length of the drying booth 21 in the movement direction is as small as possible.

The distance between successive skids 2, 2' is increased by transferring them to a higher-speed section of the skid-conveying system, while the distance is reduced by transferring them to a lower-speed section.

The invention claimed is:

1. An installation for coating objects, the installation comprising: a) a coating booth, in which at least one application device is arranged; b) a drying booth downstream of the coating booth; c) a plurality of skids each having a first skid runner and a second skid runner which run parallel to the movement direction and each skid carrying at least one object to be coated; d) a skid-conveying system, on which the skid runners of the skids rest and which guides the skids through the coating booth and the drying booth, wherein e) adjacent skids are movable into one another with their first skid runners and their second skid runners such that they partially overlap in the movement direction.

2. The installation of claim 1, wherein the skids have a supporting structure comprising: a) a supporting frame, of which the sides running parallel to the movement direction are formed by the two skid runners, the first skid runner projecting forwards beyond the supporting frame in the movement direction, while the second skid runner projects rearwards beyond the supporting frame counter to the movement direction; b) a front support, which is connected to the supporting frame and projects forwards beyond the supporting frame parallel to the first skid runner, but is at a distance from the first skid runner which is less than the distance between the two skid runners; c) a rear support, which is connected to the supporting frame and projects rearwards beyond the supporting frame parallel to the second skid runner, but is at a distance from the second skid runner which is less than the distance between the two skid runners.

3. The installation of claim 1, wherein each skid has stops which define the extent to which adjacent skids are movable into another.

4. The installation of claim 3, wherein each skid has first stops, which define the extent to which adjacent skids carrying identical objects are movable into one another, and second stops, which define the extent to which adjacent skids carrying different objects are movable into one another.

5. The installation of claim 4, wherein the second stops are formed by the skid runners and/or the supports.

6. The installation of claim 1, wherein the objects include vehicle bodies and parts thereof.

* * * * *